United States Patent
Stainvas Olshansky et al.

(10) Patent No.: US 10,185,030 B2
(45) Date of Patent: Jan. 22, 2019

(54) OBJECT BOUNDARY DETECTION FOR AUTOMOTIVE RADAR IMAGING

(71) Applicant: GM Global Technology Operations LLC, Detroit, MI (US)

(72) Inventors: Inna Stainvas Olshansky, Modiin (IL); Igal Bilik, Rehovot (IL); Oded Bialer, Petah Tikva (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 239 days.

(21) Appl. No.: 14/840,917

(22) Filed: Aug. 31, 2015

(65) Prior Publication Data

US 2016/0124087 A1    May 5, 2016

Related U.S. Application Data

(60) Provisional application No. 62/046,200, filed on Sep. 5, 2014.

(51) Int. Cl.
*G01S 13/89* (2006.01)
*B60W 30/00* (2006.01)
(Continued)

(52) U.S. Cl.
CPC ............. *G01S 13/89* (2013.01); *B60W 30/00* (2013.01); *G01S 7/411* (2013.01); *G01S 13/58* (2013.01);
(Continued)

(58) Field of Classification Search
CPC .............................. G01S 13/89; B60W 30/00
(Continued)

(56) References Cited

U.S. PATENT DOCUMENTS 5,014,200 A    5/1991   Chundrlik et al.
5,283,813 A    2/1994   Shalvi et al.
(Continued)

FOREIGN PATENT DOCUMENTS

CN    202911633 U    5/2013

OTHER PUBLICATIONS

Kundur, et al., "Blind Image Deconvolution", IEEE Signal Processing Magazine, May 1996, pp. 43-64.
(Continued)

*Primary Examiner* — Marcus E Windrich
(74) *Attorney, Agent, or Firm* — Cantor Colburn LLP

(57) ABSTRACT

An automotive radar system includes a radar camera that captures a sequence of frames of radar images of a field of view of the radar. A boundary detector receives the radar data from the radar camera and detects object boundary data in the radar data. An image processor receives the radar data and the object boundary data and performs image analysis including image deblurring and generating response control signals based at least in part on the radar data and the object boundary data. Response equipment implements one or more response actions based on the response control signals. Object boundary detection includes performing pixel-level Doppler analysis to associate pixel velocities to pixels of the radar data and identifying discontinuities in the pixel velocities. Response equipment may include, for example, one or more of a navigation display, collision avoidance warning, automatic cruise control, automatic braking, and automatic steering.

17 Claims, 2 Drawing Sheets

(51) Int. Cl.
*G01S 13/58* (2006.01)
*G01S 13/93* (2006.01)
*G01S 7/41* (2006.01)
*G01S 13/60* (2006.01)

(52) U.S. Cl.
CPC ............ *G01S 13/60* (2013.01); *G01S 13/931* (2013.01); *G01S 2013/935* (2013.01); *G01S 2013/9342* (2013.01); *G01S 2013/9346* (2013.01)

(58) Field of Classification Search
USPC .................................................... 342/70–72
See application file for complete search history.

(56) References Cited

U.S. PATENT DOCUMENTS

| | | | |
|---|---|---|---|
| 5,572,428 A | 11/1996 | Ishida et al. | |
| 5,777,563 A | 7/1998 | Minissale et al. | |
| 5,909,251 A * | 6/1999 | Guichard | G06K 9/342 |
| | | | 348/416.1 |
| 6,011,505 A * | 1/2000 | Poehler | G01S 13/9023 |
| | | | 342/191 |
| 6,223,117 B1 | 4/2001 | Labuhn et al. | |
| 6,687,577 B2 * | 2/2004 | Strumolo | G08G 1/165 |
| | | | 342/70 |
| 8,044,846 B1 * | 10/2011 | Urkowitz | G01S 13/582 |
| | | | 342/104 |
| 8,094,063 B1 * | 1/2012 | Cammerata | G01S 13/582 |
| | | | 342/179 |
| 8,577,534 B2 | 11/2013 | Dorenkamp et al. | |
| 8,605,949 B2 | 12/2013 | Zhang et al. | |
| 8,750,643 B2 | 6/2014 | Sun et al. | |
| 8,902,103 B2 * | 12/2014 | Kim | G01S 13/345 |
| | | | 342/118 |
| 2007/0009169 A1 | 1/2007 | Bhattacharjya | |
| 2012/0148112 A1 * | 6/2012 | Chen | H04N 7/0137 |
| | | | 382/107 |
| 2012/0219229 A1 * | 8/2012 | Springer | G06T 5/003 |
| | | | 382/199 |
| 2013/0223754 A1 | 8/2013 | Sun et al. | |
| 2014/0064555 A1 * | 3/2014 | Sebastian | G06T 5/003 |
| | | | 382/103 |

OTHER PUBLICATIONS

Oliveira, et al., "Adaptive Total Variation Image Deblurring: A Majorization-Minimization Approach", 14th European Signal Processing Conference (EUSIPCO 2006), Florence, Italy, Sep. 4-8, 2006, 25 pages.
Weiss, et al., "Old and New Algorithms for Blind Deconvolution", videolectures.net/nipsworkshops2011_weiss_deconvolution; 22 pages.
Xu, et al., "Iterative Nonlocal Total Variation Regularization Method for Image Restoration", PLOS One, A Peer-Reviewed, Open Access Journal; Published online Jun. 11, 2013. doi: 10.1371/journal.pone. 0065865; 12 pages.
Chinese Office Action for application No. 201510887376.3 dated Aug. 1, 2017, 9 pages.

* cited by examiner

OBJECT BOUNDARY DETECTION FOR AUTOMOTIVE RADAR IMAGING

CROSS-REFERENCE TO RELATED APPLICATION

This application is a Non-Provisional of U.S. Provisional Patent Application Ser. No. 62/046,200 filed Sep. 5, 2014, the disclosure of which is incorporated by reference herein in its entirety.

FIELD OF THE INVENTION

The subject invention relates to automotive radar systems and, more particularly, to object boundary detection to improve radar image deblurring in an automotive radar system.

BACKGROUND

Radar systems are used in motor vehicles for a variety of purposes, such as navigation display, collision avoidance warning, automatic cruise control adjustment, automatic braking, and automatic steering. In a moving vehicle, virtually all objects are moving with respect to the host vehicle. Other vehicles traveling in the same direction may appear to be moving relatively slowly, while oncoming traffic appears to be moving much more rapidly. Vehicles change speed and turn unpredictably while stationary or slow moving objects, such as hazards and pedestrians, may appear on the side of the road or in the roadway. Objects often become temporarily obstructed by other objects only to appear suddenly in the field of view. Objects moving at different speeds therefore continually come into and out of the radar's field of view in an unpredictable way in the ordinary course of driving. This presents a challenging situation for automotive radar systems implementing automated object detection, classification, threat detection and response.

Image deblurring is an important aspect of radar image processing in automotive radar systems. Image deblurring techniques are generally more effective when additional information about the image, often referred to as "priors," is available to augment the raw radar data. For example, prior information regarding the boundaries of objects in the image moving at different speeds can be utilized to greatly enhance image deblurring using known techniques. Unfortunately, automotive radar data is usually provided with "weak priors" meaning that little or no information is available regarding the content of the image prior to image processing. Deblurring of images including multiple objects moving at different speeds with "weak priors" is therefore known to be a challenging problem. The challenge is exacerbated in an automotive radar system, in which virtually all of the objects are moving at different relative speeds and often become temporarily obscured while passing through the field of view.

Accordingly, it is desirable to provide an improved radar image processing system for deblurring radar images with "weak priors" in automotive radar systems. More specifically, there is a need for object boundary detection techniques for use in subsequent image deblurring, object detection and response in automotive radar systems.

SUMMARY OF THE INVENTION

In one exemplary embodiment of the invention, a vehicle includes a radar system with a radar camera that captures a sequence of radar frames of view of the radar camera. A boundary detector receives the radar data from the radar camera and detects object boundary data in the radar data. An image processor receives the radar data and the object boundary data and performs image analysis including image deblurring and generating response control signals based at least in part on the radar data and the object boundary data. Response equipment implements one or more response actions based on the response control signals. According to an aspect of the embodiment, object boundary detection includes performing pixel-level Doppler analysis to associate pixel velocities to pixels of the radar data and identifying discontinuities in the pixel velocities. Response equipment may include a navigation display, collision avoidance warning, and automatic cruise control, braking system, and steering.

In another exemplary embodiment of the invention, a vehicle is controlled by capturing radar data comprising a sequence of frames of radar images. Pixel-level Doppler analysis is used to associate pixel velocities to pixels of the radar data and object boundaries are identified by detecting discontinuities in the pixel velocities. Object boundary identification may also include identifying boundaries over sequences of frames of the radar data. Image deblurring is based at least in part on the radar data and the object boundary data. Response actions may include one or more of displaying radar images on a navigation display, activating a collision avoidance warning, activating an automatic cruise control adjustment system, activating an automatic braking system, and activating an automatic steering system.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
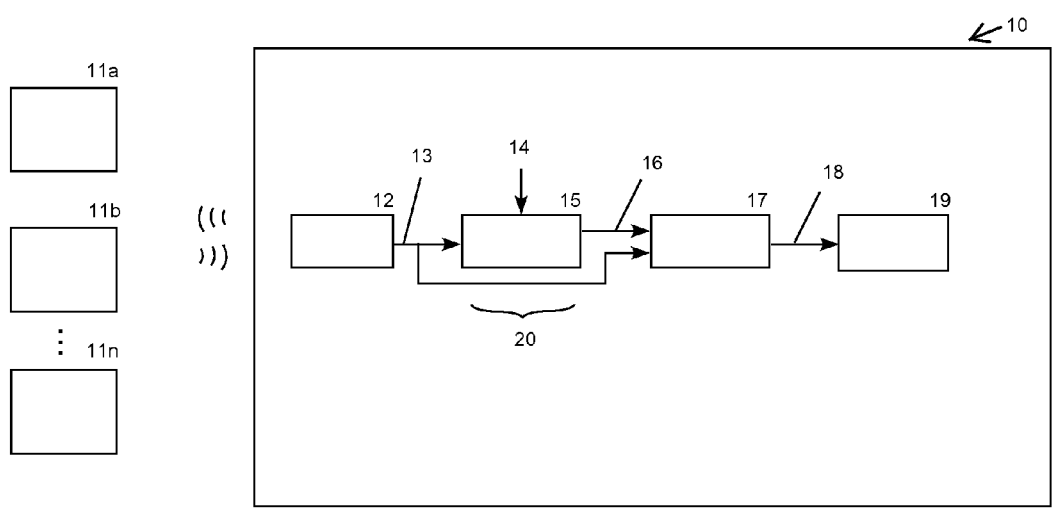
FIG. 1 is a block diagram of an automotive radar system.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment of the invention illustrated in FIG. 1, a vehicle 10, which may be moving, contains a radar 12 (may also be referred to as a radar camera) used to image the environment around the vehicle. For the purpose of illustrating the object boundary technique of the embodiment in this example there are a number of objects 11a-11n in the field of view of the radar that may be moving at different speeds with respect to the vehicle 10 and with respect to each other. For example, the objects may include traffic moving in the same direction as the vehicle, oncoming traffic, vehicles turning, objects alongside or in the roadway, objects in the background environment, and so forth. The radar 12 captures sequential frames of radar data 13 (may also be referred to as a radar frame sequence), which are passed downstream for image analysis and response action. The radar data 13 and optional vehicle velocity information 14 from the vehicle's speedometer are provided to an object boundary detector 15, which produces object boundary data 16 (may also be referred to as object boundaries) in "real time" for use in subsequent image processing represented by an image processor 17. In general, the image processor 17 performs image analysis including image deblurring, object identification, threat detection, and generating response control signals 18 based at least in part on the radar data and the object boundary data. The response control signals 18 are utilized by response equipment 19 to respond to the radar data, such as displaying images on a navigation display, activating alarms, crash preparation, and taking active evasion or collision avoidance actions.

The present disclosure primarily concerns the boundary detection techniques 20 implemented by the boundary detector 15, which may be utilized with any suitable type of radar 12, image processor 17, and response equipment 19. In general, the millimeter-wave frequency band around 77 GHz to 81 GHz is reserved for the automotive radar 12, while image processor 17 generally implements image deblurring, object identification, threat detection, and other image processing tasks associated with the specific radar system in the host vehicle. Typical response equipment 19 may include a navigation display, a collision avoidance system, and a range of active collision avoidance equipment, such as automatic cruise control adjustment, automatic braking and automatic steering. The object boundary detection techniques 20 are largely indifferent to the other elements of the radar system and therefore may be utilized as a component of a wide range of automotive radar systems.

A few specific example of automotive radar systems in which the boundary detection techniques may be utilized are described in U.S. Pat. Nos. 8,577,534; 6,223,117; 5,777,563; 5,572,428; and 5,014,200, which are submitted with this disclosure and form a part of this application and will be incorporated by reference into the non-provisional application. Illustrative examples of image processing techniques that may utilize the object boundaries produced by the boundary detector are described in U.S. Pat. Nos. 8,750,643; 5,283,813, which are also submitted with this disclosure and form a part of this application and will likewise be incorporated by reference into the non-provisional application. It is emphasized that these specific references merely provide illustrative examples of systems in which the boundary detection techniques may be utilized and in no way limit the embodiments to these specific examples. In addition, while the exemplary embodiments are described in the context of a radar system for an automobile, the boundary detection techniques may also be applied to radar systems generally including those for other types of moving vehicles, such as marine vehicles, aircraft, spacecraft and so forth.

Figure 2:
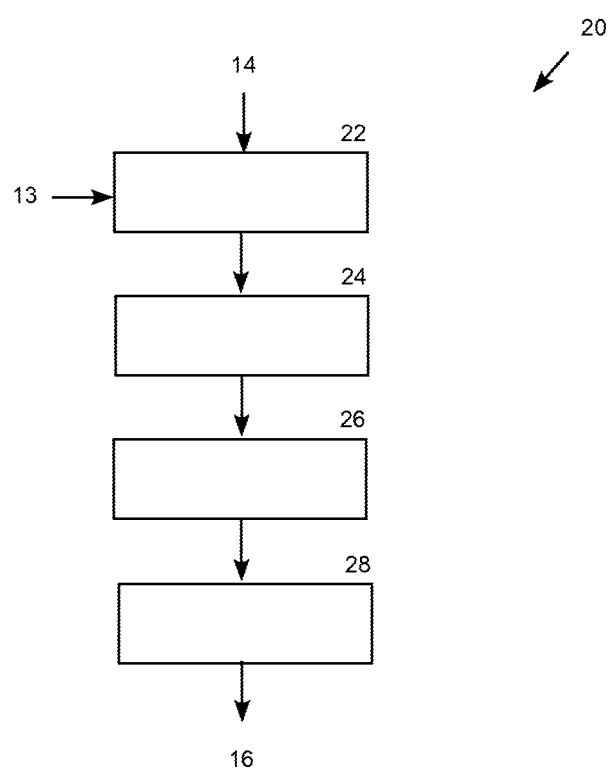
FIG. 2 is a logic flow diagram of an object boundary technique in the automotive radar system.

FIG. 2 is a logic flow diagram of the object boundary detection technique 20 suitable for implementation by the object boundary detector 15 of the automotive radar system shown FIG. 1. In block 22, the object boundary detector 15 receives the radar frame sequence 13 and optional vehicle velocity information 14 and utilizes this data to perform pixel-level Doppler analysis. More specifically, Doppler analysis, optionally augmented with the vehicle velocity providing a vehicle frame of reference velocity, is utilized to associate a pixel velocity with each pixel of each frame of the raw radar data. Block 22 is followed by block 24, in which the object boundary detector 15 detects discontinuities in the velocity to identify object boundaries (may also be referred to as velocity discontinuity analysis). Block 24 is followed by block 26, in which the object boundary detector 15 identifies continuities in boundaries that persist over sequences of frames (may also be referred to as frame sequence continuity analysis). Block 26 is followed by block 28, in which the object boundary detector 15 utilizes the velocity discontinuity data and the boundary continuity data to identify object boundaries in the radar data (may also be referred to as object boundary identification).

The object boundary detection techniques 20 may be performed sufficiently rapidly with conventional microprocessor technology to be utilized in "real time" in subsequent image processing to support effective navigation and response actions in automotive applications. That is, object boundary detection is accomplished through straightforward pixel-level processing technique amenable to implementation in "real time" for the purpose of navigation display, collision avoidance warning, and automated control of an automobile operated at normal road speeds. This allows the real time object boundary detection to effectively turn raw radar data with "weak priors" into object-segmented radar data with "strong priors" in the form of object boundaries for use in subsequent image processing and vehicle control. The object boundaries are particularly useful in image deblurring, which is typically the next step applied in the image processing sequence followed by object identification, threat detection and so forth. Having well-defined boundaries and sharply deblurred objects improves all aspects of subsequent image processing and response.

More specifically, object boundaries are detected by finding pixel-level discontinuities of the pixel velocities by applying a differential operator on the Doppler velocity. The Doppler velocity can be represented as a 3d image: V (x, y, z) where x, y, z represent the pixel coordinates in the radar's field of view (or 2d image if only x, y are given). The velocity discontinuity is determined by using a gradient operator of V(x, y, z). For a 3d image, the gradient is a vector field $$\nabla V = \left[ \frac{\partial V}{\partial x}, \frac{\partial V}{\partial y}, \frac{\partial V}{\partial z} \right]$$

defined for each point of the image. The norm of this vector field $\|\nabla V\|$ is a characteristic of the vector field discontinuity. When $\|\nabla V\|$ is large, the vector field is discontinuous.

The object boundaries are supplied to a deblurring filter that can be represented in part by a transfer function designated as H. The transfer function H is generally defined to be the function which, after acting on an ideal intensity radar image I, generates an image that is similar to the observed data measured by the radar while, at the same time, imposing smoothness properties on the ideal image. The smoothness should generally be greater where the velocity discontinuity field $\|\nabla V\|$ is small and should be lower in the areas of large velocity discontinuity. In other words, boundary detection is taken in account during the deblurring process by adaptively relaxing the smoothness requirement of the deblurring transfer function H in the areas of object boundaries determined by the object boundary detector. Alternatively, the deblurring transfer function may impose sharpness constraints on the ideal image and then allow greater sharpness in the areas of large $\|\nabla V\|$ and smaller sharpness in the areas of small $\|\nabla V\|$. In other words, a monotonically falling regularization function depending on $\|\nabla V\|$: $\lambda_1(\|\nabla V\|)$ can be determined adaptively based on the discontinuity field to take the boundary detection into account in the image deblurring process. This monotonic function does not have to be strictly monotonic, so that it can be squashed (assigned to zero or some small constant value) depending on thresholds.

This approach may be reflected in the context of the well-known framework of the blind deblurring (deconvolution) transfer function, where the minimum of the functional below is sought:

$$H^*, I^* = \underset{H,I}{\operatorname{argmin}} \|I_0 - HI\| + \lambda_1 \|L_1 I\| + \lambda_2 \|L_2 H\|$$

where H*, I* are the reconstructed (optimal) deblur filter and ideal image, $L_1$ is any smoothness operator on the ideal image I and $L_2$ is a prior operator on the filter H. The function $\lambda_1$ is adaptively selected to reflect object boundaries in the image deblurring process, such as the procedure described by the equation above. In this particular example, the detected object boundaries allow the second term of the expression above to be determined adaptively based on the detected velocity discontinuity during the image deblurring procedure. It will be appreciated that this is merely one example of a known deblurring procedure and other deblurring operations as well as other types of image processing operations may utilize the object boundary data.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle having a radar system comprising:
a radar configured to capture radar data comprising a sequence of frames of Doppler and image data and to form a sequence of radar images of a field of view of the radar from the image data, wherein the radar images include pixels having associated pixel velocities obtained from the Doppler data;
a boundary detector configured to receive the radar images from the radar, detect object boundary data in the radar images, wherein an object boundary in an image includes a pixel having a discontinuity indicated by a gradient of pixel velocities, and identify the discontinuity in the pixel velocity by computing a norm of a gradient of the pixel velocity;
an image processor configured to receive the radar images and the object boundary data, deblur the radar images by applying a filter to the radar images that imposes a sharpness constraint on the image that allows greater sharpness in areas of large norm and smaller sharpness in areas of small norm, and generate a response control signal based at least in part on the deblurred radar images; and
response equipment operative for implementing one or more response actions based on the response control signals.

2. The vehicle of claim 1, wherein the boundary detector is further configured to perform pixel-level Doppler analysis to associate pixel velocities to pixels of the radar image.

3. The vehicle of claim 1, wherein the boundary detector is further configured to detect object boundary data by identifying boundary continuities over sequences of frames of the radar data.

4. The vehicle of claim 1, wherein the boundary detector is further configured to receive vehicle velocity information and to utilize the vehicle velocity in detecting the object boundary data.

5. The vehicle of claim 1, wherein the image processor is further configured to utilize the object boundary data as an adaptive parameter in an image deblurring transfer function.

6. The vehicle of claim 5, wherein the image deblurring transfer function is in the form:

$$H^*, I^* = \underset{H,I}{\operatorname{argmin}} \|I_0 - HI\| + \lambda_1 \|L_1 I\| + \lambda_2 \|L_2 I\|; \quad (6)$$

and
wherein the object boundary data is reflected in the image deblurring transfer function is through adaptive determination of the parameter $\lambda_1$.

7. The vehicle of claim 1, wherein the radar camera is configured to operate in the frequency range of 77 GHz to 81 GHz.

8. The vehicle of claim 1, wherein:
the response equipment includes one or more of a navigation display, a collision avoidance warning, an automatic cruise control adjustment system, an automatic braking system, and an automatic steering system; and
the boundary detector determines the object boundary data and the image processor utilizes the object boundary data for image deblurring in real time to support effective response actions to objects identified in the radar data.

9. A radar system for a moving vehicle, comprising:
a radar configured to capture radar data comprising a sequence of frames of Doppler and image data and to form a sequence of radar images of a field of view of the radar from the image data, wherein the radar images include pixels having associated pixel velocities obtained from the Doppler data;
a boundary detector configured to receive the radar images from the radar, detect object boundary data in the radar images, wherein an object boundary in an image includes a pixel having a discontinuity indicated by a gradient of pixel velocities, and identify the discontinuity in the pixel velocity by computing a norm of a gradient of the pixel velocity; and
an image processor operative configured to receive the radar image and the object boundary data, deblur the radar image by applying a filter to the radar images that imposes a sharpness constraint on the image that allows greater sharpness in areas of large norm and smaller sharpness in areas of small norm, and generate a response control signal based at least in part on the deblurred radar images.

10. The radar system of claim 9, wherein the boundary detector is further configured to perform pixel-level Doppler analysis to associate pixel velocities to pixels of the radar data.

11. The radar system of claim 10, wherein the boundary detector is further configured to detect object boundary data by identifying discontinuities in the pixel velocities.

12. The radar system of claim 11, wherein the boundary detector is further configured to identify discontinuities in the pixel velocities by computing a gradient of the pixel velocities.

13. The radar system of claim 12, wherein the boundary detector is further configured to detect object boundary data by identifying boundary continuities over sequences of frames of the radar data.

14. The radar system of claim 9, wherein the image processor is further configured to utilize the object boundary data as an adaptive parameter in an image deblurring transfer function.

15. A method for controlling a vehicle, comprising:
capturing radar data comprising a sequence of frames of Doppler and image data and to form a sequence of radar images from the image data, wherein the radar images include pixels having associated pixel velocities obtained from the Doppler data;
detecting object boundary data in the radar images, the object boundary data including a pixel having a discontinuity in a gradient of the pixel velocities, by identifying the discontinuity in the pixel velocity by computing a norm of a gradient of the pixel velocity;
deblurring the radar images by applying a filter to the image that relaxes a smoothness property on the images at pixels representing the object boundary;
generating a response control signal based at least in part on the deblurred radar images; and
implementing one or more response actions at the vehicle based on the response control signal to control the vehicle.

16. The method of claim 15, wherein detecting object boundary data further comprises identifying boundary continuities over sequences of frames of the radar data.

17. The method of claim 15, further comprising implementing one or more response actions based on the response control signals including one or more of displaying radar images on a navigation display, activating a collision avoidance warning, activating an automatic cruise control adjustment system, activating an automatic braking system, and activating an automatic steering system.

* * * * *